United States Patent
Yan et al.

(10) Patent No.: US 11,008,026 B2
(45) Date of Patent: May 18, 2021

(54) MOTOR TRAIN UNIT FECES COLLECTING SYSTEM AND OPERATING METHOD THEREOF

(71) Applicant: SHANDONG CRRC HUATENG ENVIRONMENT CO., LTD., Shandong (CN)

(72) Inventors: Sheng Yan, Jinan (CN); Daokun Zhang, Jinan (CN); Kai Li, Jinan (CN); Xinyu Liu, Jinan (CN); Tengcheng Ling, Jinan (CN); Dan Liu, Jinan (CN); Chao Long, Jinan (CN)

(73) Assignee: SHANDONG CRRC HUATENG ENVIRONMENT CO., LTD., Jinan (CN)

( * ) Notice: Subject to any disclaimer, the term of this patent is extended or adjusted under 35 U.S.C. 154(b) by 0 days.

(21) Appl. No.: 16/635,653

(22) PCT Filed: Aug. 18, 2017

(86) PCT No.: PCT/CN2017/097996
§ 371 (c)(1),
(2) Date: Jan. 31, 2020

(87) PCT Pub. No.: WO2019/024135
PCT Pub. Date: Feb. 7, 2019

(65) Prior Publication Data
US 2021/0024105 A1 Jan. 28, 2021

(30) Foreign Application Priority Data
Jul. 31, 2017 (CN) .......................... 201710641501.1

(51) Int. Cl.
*B61D 35/00* (2006.01)

(52) U.S. Cl.
CPC ................................ *B61D 35/007* (2013.01)

(58) Field of Classification Search
CPC ..................................................... B61D 35/007
(Continued)

(56) References Cited

FOREIGN PATENT DOCUMENTS

| CN | 2529799 Y | 1/2003 |
| CN | 103419804 A | 12/2013 |

(Continued)

OTHER PUBLICATIONS

Mar. 18, 2019 Office Action issued in Chinese Patent Application No. 201710641501.1.
(Continued)

*Primary Examiner* — Lori L Baker
(74) *Attorney, Agent, or Firm* — Oliff PLC

(57) ABSTRACT

A motor train unit feces collecting system and an operating method thereof solve the problems of high energy consumption and complicated structure. A reciprocating motion device directly drives a piston to alternately change the positive and negative pressure in sewage disposal, without providing an intermediate tank, so the system is simple in structure and low in energy consumption. The system includes a blow-off line for connecting a toilet with a sewage tank and connected to a positive and negative pressure switching device which includes a by-pass line, the openings at both ends of the by-pass line are in communication with the blow-off line, a piston is disposed in the by-pass line and connected to a reciprocating motion device which drives the piston to move to change the positive and negative pressure condition of upper and lower regions of the by-pass line.

20 Claims, 1 Drawing Sheet

(58) Field of Classification Search
USPC .......... 4/321, 300, 315, 322–324, 249, 378
See application file for complete search history.

(56) References Cited

FOREIGN PATENT DOCUMENTS

| | | |
|---|---|---|
| CN | 203332128 U | 12/2013 |
| CN | 105270425 A | 1/2016 |

OTHER PUBLICATIONS

Mar. 18, 2019 Search Report issued in Chinese Patent Application No. 201710641501.1.
May 3, 2018 International Search Report issued in International Patent Application No. PCT/CN2017/097996.
May 3, 2018 Written Opinion issued in International Patent Application No. PCT/CN2017/097996.

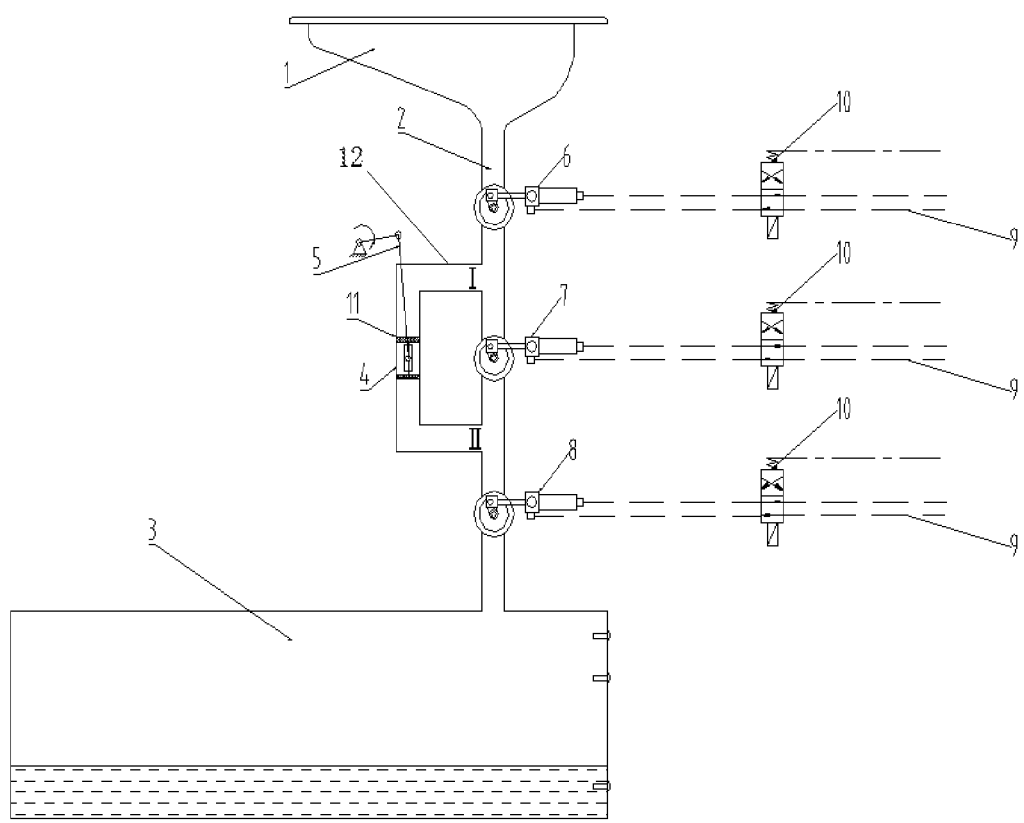

MOTOR TRAIN UNIT FECES COLLECTING SYSTEM AND OPERATING METHOD THEREOF

FIELD OF THE INVENTION

The present invention relates to the field of motor train unit sewage disposal technology, and specifically to a motor train unit feces collecting system and an operating method thereof.

BACKGROUND OF THE INVENTION

At present, the motor train unit feces collecting system usually adopts a structure that includes an intermediate tank through which the sewage is collected to a normal pressure sewage tank. When a toilet is flushed, the negative pressure is first produced in the intermediate tank by an ejector, a water booster flushes the toilet, an inlet valve of the intermediate tank is opened, and the sewage in the toilet is sucked into the intermediate tank; then the inlet valve is closed, the intermediate tank produces the positive pressure by means of compressed air, an outlet valve in communication with the sewage tank under the motor train unit is opened to push the sewage to the sewage tank, and the sewage is collected accordingly.

The intermediate tank of the existing motor train unit feces collector produces the negative pressure by means of an ejector, and compressed air is directly introduced to produce the positive pressure, so that the feces collector consumes a lot of compressed air during sewage disposal with huge air consumption and high energy consumption. In addition, the existing motor train unit feces collector needs to be provided with an intermediate tank, an ejector and the like, so that the whole structure is very complicated and the control process is more cumbersome.

Based on the above, the prior art lacks an effective solution for the problems of high energy consumption and complicated structure of the motor train unit feces collector.

SUMMARY OF THE INVENTION

In order to overcome the above deficiencies of the prior art, the present invention provides a motor train unit feces collecting system, wherein a reciprocating motion device directly drives a piston to alternately change the positive and negative pressure in sewage disposal, without providing an intermediate tank so that the system is simple in structure and low in energy consumption.

Further, the present invention adopts the following technical solution:

A motor train unit feces collecting system, including a blow-off line, wherein the blow-off line connects a toilet with a sewage tank; the blow-off line is connected to a positive and negative pressure switching device, the positive and negative pressure switching device includes a by-pass line, the openings at both ends of the by-pass line are in communication with the blow-off line, a piston is disposed in the by-pass line, the piston is connected to a reciprocating motion device, and the reciprocating motion device drives the piston to move to change the positive and negative pressure condition of an upper region and a lower region of the by-pass line.

Further, the blow-off line is provided with a plurality of blow-off valves, and the plurality of blow-off valves divide the blow-off line into a plurality of regions.

Further, the blow-off line is provided with a first blow-off valve between a portion of communication with the upper opening of the by-pass line and the toilet.

Further, the first blow-off valve is in communication with a compressed air source, the first blow-off valve is connected to a solenoid valve, and the solenoid valve communicates with a controller.

Further, the blow-off line is provided with a second blow-off valve between portions of communication with the openings at the both ends of the by-pass line.

Further, the second blow-off valve is in communication with a compressed air source, the second blow-off valve is connected to a solenoid valve, and the solenoid valve communicates with a controller.

Further, the blow-off line is provided with a third blow-off valve between a portion of communication with the lower opening of the by-pass line and the sewage tank.

Further, the third blow-off valve is in communication with a compressed air source, the third blow-off valve is connected to a solenoid valve, and the solenoid valve communicates with a controller.

Further, a position sensor is disposed on the piston, and the position sensor communicates with a controller.

Further, the reciprocating motion device includes a crank link mechanism, and a link of the crank link mechanism is connected to the piston.

Alternatively, the reciprocating motion device includes an eccentric link mechanism, and a link of the eccentric link mechanism is connected to the piston.

Alternatively, the reciprocating motion device includes a hydraulic device, and an actuator of the hydraulic device is connected to the piston.

An operating method of the motor train unit feces collecting system includes the following steps:

in an initial state, the piston is at the bottom, and the negative pressure is formed in the region the by-pass line at the upper part of the piston; when the toilet is actuated, the first blow-off valve is opened, and the sewage is sucked by means of the negative pressure to the portion of communication between the blow-off line and the upper opening of the by-pass line; the reciprocating motion device drives the piston to move up to the top, the positive pressure is formed in the region of the by-pass line at the upper part of the piston, and the negative pressure is formed in the region of the by-pass line at the lower part of the piston; the second blow-off valve is opened, and the sewage is pushed by the positive pressure and sucked by the negative pressure to the portion of communication between the blow-off line and the lower opening of the by-pass line; the reciprocating motion device drives the piston to move down to the bottom, the positive pressure is formed in the region of the by-pass line at the lower part of the piston, the third blow-off valve is opened, and the sewage is discharged to the sewage tank under the action of the positive pressure; and the third blow-off valve is closed to complete one cyclic sewage disposal operation.

Compared with the prior art, the present invention has the following advantages:

According to the motor train unit feces collecting system of the present invention, a positive and negative pressure switching device is disposed to be connected to a blow-off line, a piston and a reciprocating motion device are disposed in the positive and negative pressure switching device, the reciprocating motion device drives the piston to move up and down, so that the positive pressure and negative pressure alternate changing in an upper region and a lower region of the by-pass line if performed, then the conventional sewage disposal mode of an intermediate tank is replaced, the structure is simplified, the air consumption is greatly reduced, and the system is energy-saving, simple in structure and low in cost.

According to the motor train unit feces collecting system of the present invention, with the configuration of a plurality of blow-off valves, the plurality of blow-off valves cooperate with action of the positive and negative pressure switching device and are sequentially opened, to complete the collection of sewage from a toilet to a sewage tank.

According to the motor train unit feces collecting system of the present invention, a position sensor is disposed to detect the position of the piston, and each blow-off valve cooperates with a solenoid valve, so that the opening and closing of the blow-off valves can be controlled by the controller quickly and accurately according to the position of the piston without human operation.

BRIEF DESCRIPTION OF THE DRAWING

The accompanying drawing constituting a part of the present application is used for providing a further understanding of the present application, and the schematic embodiments of the present application and the descriptions thereof are used for interpreting the present application, rather than constituting improper limitations to the present application.

FIG. 1 is a schematic structural diagram of a motor train unit feces collecting system according to the present invention;

In the FIGURE: 1 toilet, 2 blow-off line, 3 sewage tank, 4 piston, 5 reciprocating motion device, 6 first blow-off valve, 7 second blow-off valve, 8 third blow-off valve, 9 compressed air source, 10 solenoid valve, 11 position sensor, 12 by-pass line.

DETAILED DESCRIPTION OF EMBODIMENTS

It should be pointed out that the following detailed descriptions are all exemplary and aim to further illustrate the present application. Unless otherwise specified, all technical and scientific terms used in the descriptions have the same meanings generally understood by those of ordinary skill in the art of the present application.

It should be noted that the terms used herein are merely for describing specific embodiments, but are not intended to limit exemplary embodiments according to the present application. As used herein, unless otherwise explicitly pointed out by the context, the singular form is also intended to include the plural form. In addition, it should also be understood that when the terms "include" and/or "comprise" are used in the specification, they indicate features, steps, operations, devices, components and/or combination thereof.

As described in the background, the prior part has the problems of high energy consumption and complicated structure of the motor train unit feces collector. In order to solve the above technical problems, the present application proposes a motor train unit feces collecting system and an operating method thereof.

In a typical embodiment of the present application, as shown in FIG. 1, a motor train unit feces collecting system is provided, including a blow-off line 2 for connecting a toilet 1 with a sewage tank 3; the blow-off line 2 is connected to a positive and negative pressure switching device, the positive and negative pressure switching device includes a by-pass line 12, the openings at both ends of the by-pass line 12 are in communication with the blow-off line 2, a piston 4 is disposed in the by-pass line 12, the piston 4 is connected to a reciprocating motion device 5, and the reciprocating motion device 5 drives the piston 4 to move to change the positive and negative pressure condition of an upper region and a lower region of the by-pass line 12. According to the motor train unit feces collecting system of the present invention, a positive and negative pressure switching device is disposed to be connected to a blow-off line, a piston and a reciprocating motion device are disposed in the positive and negative pressure switching device, the reciprocating motion device drives the piston to move up and down, so that the positive pressure and the negative pressure alternate changing in an upper region and a lower region of the by-pass line is performed, then the conventional sewage disposal mode of an intermediate tank is replaced, the structure is simplified and the air consumption is greatly reduced.

The blow-off line 2 is provided with a plurality of blow-off valves, and the plurality of blow-off valves divide the blow-off line 2 into a plurality of regions.

The blow-off line 2 is provided with a first blow-off valve 6 between a portion of communication with the upper opening of the by-pass line 12 and the toilet 1. The first blow-off valve 6 is in communication with a compressed air source 9, the first blow-off valve 6 is connected to a solenoid valve 10, and the solenoid valve 10 communicates with a controller.

The blow-off line 2 is provided with a second blow-off valve 7 between portions of communication with the openings at the both ends of the by-pass line 12. The second blow-off valve 7 is in communication with the compressed air source 9, the second blow-off valve 7 is connected to a solenoid valve 10, and the solenoid valve 10 communicates with the controller.

The blow-off line 2 is provided with a third blow-off valve 8 between a portion of communication with the lower opening of the by-pass line 12 and the sewage tank 3. The third blow-off valve 8 is in communication with the compressed air source 9, the third blow-off valve 8 is connected to the solenoid valve 10, and the solenoid valve 10 communicates with the controller.

With the configuration of the plurality of blow-off valves, the plurality of blow-off valves cooperate with action of the positive and negative pressure switching device and are sequentially opened, to complete the collection of sewage from the toilet to the sewage tank.

A position sensor 11 is disposed on the piston 4, and the position sensor 11 communicates with the controller. The position sensor is disposed to detect the position of the piston, and each blow-off valve cooperates with a solenoid valve, so that the opening and closing of the blow-off valves can be controlled by the controller quickly and accurately according to the position of the piston without human operation.

The reciprocating motion device 5 may involve one of the following three solutions, and may also be a device capable of driving the piston to reciprocate up and down:

The reciprocating motion device 5 includes a crank link mechanism, and a link of the crank link mechanism is connected to the piston 4.

Alternatively, the reciprocating motion device 5 includes an eccentric link mechanism, and a link of the eccentric link mechanism is connected to the piston 4.

Alternatively, the reciprocating motion device 5 includes a hydraulic device, and an actuator of the hydraulic device is connected to the piston 4.

In another typical embodiment of the present application, an operating method of the motor train unit feces collecting system is provided, including the following steps:

In an initial state, the piston 4 is at the bottom, and the negative pressure is formed in region of the by-pass line 12 at the upper part of the piston 4; when the toilet 1 is actuated, the first blow-off valve 6 is opened, and the sewage is sucked by means of the negative pressure to the portion of communication between the blow-off line 2 and the upper opening of the by-pass line 12; the reciprocating motion device 5 drives the piston 4 to move up to the top, the positive pressure is formed in region of the by-pass line 12 at the upper part of the piston 4, and the negative pressure is formed in the region of the by-pass line 12 at the lower part of the piston 4; the second blow-off valve 7 is opened, and the sewage is pushed by the positive pressure and sucked by the negative pressure to the portion of communication between the blow-off line 2 and the lower opening of the by-pass line 12; the reciprocating motion device 5 drives the piston 4 to move down to the bottom, the positive pressure is formed in the region of the by-pass line 12 at the lower part of the piston 4, the third blow-off valve 8 is opened, and the sewage is discharged to the sewage tank 3 under the action of the positive pressure; and the third blow-off valve 8 is closed to complete one cyclic sewage disposal operation.

When the above operation is performed, the position sensor 11 detects the position of the piston 4, and then the controller controls the operation of the blow-off valve through the solenoid valve 10; for example, in the initial state, the piston 4 is at the bottom, the controller controls the solenoid valve 10 of the first blow-off valve 6, and then the first blow-off valve 6 is opened; when the piston moves to the top, the controller controls the solenoid valve 10 of the second blow-off valve 7 after receiving a signal, and then the second blow-off valve 7 is opened; when the piston moves to the bottom, the controller controls the solenoid valve 10 of the third blow-off valve 8 after receiving a signal, and then the third blow-off valve 8 is opened.

In order that those skilled in the art can understand the technical solution of the present application more clearly, the technical solution of the present application will be described in detail below in combination with a specific embodiment.

The toilet 1 cooperates with a flushing device, and each blow-off valve cooperates with the positive and negative pressure switching device after flushing, to complete the collection of sewage from the toilet to the sewage tank.

In the present embodiment, the reciprocating motion device is a crank link mechanism.

For convenience of description, the portion of communication between the blow-off line 2 and the upper opening of the by-pass line 12 in FIG. 1 is defined as a region I, the portion of communication between the blow-off line 2 and the lower opening of the by-pass line 12 is defined as a region II, and the positive and negative pressure switching device just causes the positive pressure and negative pressure of the region I and the region II to alternately change.

In the initial state, the first blow-off valve 6, the second blow-off valve 7, and the third blow-off valve 8 are closed, the piston 4 is at the bottom, the region I is of the negative pressure, and the region II is of the normal pressure.

When the toilet 1 is actuated, the first blow-off valve 6 is opened, the sewage in the toilet 1 is sucked to the region I under the action of the negative pressure, the first blow-off valve 6 is closed, then the crank begins to rotate, and the link drives the piston 4 to move up, so that the positive pressure is formed in the region I, and negative pressure is formed in the region II. When the piston 4 is at the top, the positive and negative pressure values reach the maximum, at this time, the second blow-off valve 7 is opened, the sewage in the region I enters into the region II under the action of the positive and negative pressure, and then the second blow-off valve 7 is closed.

The crank continues to rotate, and the link drives the piston 4 to move down, so that the negative pressure is formed in the region I, and the positive pressure is formed in the region II. When the piston 4 is at the bottom, the positive and negative pressure values reach the maximum, at this time, the third blow-off valve 8 is opened, the sewage in the toilet 1 is discharged to the sewage tank 3 under the action of the positive pressure, the third blow-off valve 8 is closed, and one cycle ends.

The reciprocating motion device drives the piston to reciprocate, the positive pressure and the negative pressure alternately change in the lines, and the opening and closing of a few blow-off valves are further controlled to collect the sewage in the toilet.

The present invention overcomes the problem of high air consumption for vacuum extraction of an ejector in the prior art, saves a complicated intermediate tank, and can realize the functions of vacuum extraction and compression of the intermediate tank, so that the structure of the feces collector is simple and the energy consumption is reduced.

Described above are merely preferred embodiments of the present application, and the present application is not limited thereto. Various modifications and variations may be made to the present application for those skilled in the art. Any modification, equivalent substitution, improvement or the like made within the spirit and principle of the present application shall fall into the protection scope of the present application.

The invention claimed is:

1. A motor train unit feces collecting system, comprising:
   a blow-off line;
   a toilet;
   a sewage tank; and
   a positive and negative pressure switching device; wherein
   the blow-off line connects the toilet with the sewage stank,
   the blow-off line is connected to the positive and negative pressure switching device,
   the positive and negative pressure switching device comprises a by-pass line where openings at both ends of the by-pass line are in communication with the blow-off line,
   a piston is in the by-pass line,
   the piston is connected to a reciprocating motion device, and
   the reciprocating motion device drives the piston to move to change a positive and negative pressure condition of an upper region and a lower region of the by-pass line.

2. The motor train unit feces collecting system according to claim 1, wherein a plurality of blow-off valves are connected to the blow-off line, and the plurality of blow-off valves divide the blow-off line into a plurality of regions.

3. The motor train unit feces collecting system according to claim 2, wherein a first blow-off valve of the plurality of blow-off valves is between a portion of the blow-off line in communication with the upper opening of the by-pass line and the toilet.

4. The motor train unit feces collecting system according to claim 3, wherein the first blow-off valve is in communication with a compressed air source, the first blow-off valve is connected to a solenoid valve, and the solenoid valve communicates with a controller.

5. The motor train unit feces collecting system according to claim 2, wherein a second blow-off valve of the plurality of blow-off valves is between portions of the blow-off line in communication with the openings at the both ends of the by-pass line.

6. The motor train unit feces collecting system according to claim 5, wherein the second blow-off valve is in communication with a compressed air source, the second blow-off valve is connected to a solenoid valve, and the solenoid valve communicates with a controller.

7. The motor train unit feces collecting system according to claim 2, wherein a third blow-off valve of the plurality of blow-off valves is between a portion of the blow-off line in communication with the lower opening of the by-pass line and the sewage tank; the third blow-off valve is in communication with a compressed air source, the third blow-off valve is connected to a solenoid valve, and the solenoid valve communicates with a controller.

8. The motor train unit feces collecting system according to claim 1, wherein a position sensor is on the piston, and the position sensor communicates with a controller.

9. The motor train unit feces collecting system according to claim 1, wherein the reciprocating motion device comprises a crank link mechanism, and a link of the crank link mechanism is connected to the piston.

10. An operating method of the motor train unit feces collecting system according to claim 1, comprising the following steps:
in an initial state, the piston is at the bottom, and the negative pressure is formed in the region of the by-pass line at the upper part of the piston; when the toilet is actuated, the first blow-off valve is opened, and the sewage is sucked by the negative pressure to the portion of communication between the blow-off line and the upper opening of the by-pass line; the reciprocating motion device drives the piston to move up to the top, the positive pressure is formed in the region of the by-pass line at the upper part of the piston, and the negative pressure is formed in the region of the by-pass line at the lower part of the piston; the second blow-off valve is opened, and the sewage is pushed by the positive pressure and sucked by the negative pressure to the portion of communication between the blow-off line and the lower opening of the by-pass line; the reciprocating motion device drives the piston to move down to the bottom, the positive pressure is formed in the region of the by-pass line at the lower part of the piston, the third blow-off valve is opened, and the sewage is discharged to the sewage tank under the action of the positive pressure; and the third blow-off valve is closed to complete one cyclic sewage disposal operation.

11. An operating method of the motor train unit feces collecting system according to claim 2, comprising the following steps:
in an initial state, the piston is at the bottom, and the negative pressure is formed in the region of the by-pass line at the upper part of the piston; when the toilet is actuated, the first blow-off valve is opened, and the sewage is sucked by the negative pressure to the portion of communication between the blow-off line and the upper opening of the by-pass line; the reciprocating motion device drives the piston to move up to the top, the positive pressure is formed in the region of the by-pass line at the upper part of the piston, and the negative pressure is formed in the region of the by-pass line at the lower part of the piston; the second blow-off valve is opened, and the sewage is pushed by the positive pressure and sucked by the negative pressure to the portion of communication between the blow-off line and the lower opening of the by-pass line; the reciprocating motion device drives the piston to move down to the bottom, the positive pressure is formed in the region of the by-pass line at the lower part of the piston, the third blow-off valve is opened, and the sewage is discharged to the sewage tank under the action of the positive pressure; and the third blow-off valve is closed to complete one cyclic sewage disposal operation.

12. An operating method of the motor train unit feces collecting system according to claim 3, comprising the following steps:
in an initial state, the piston is at the bottom, and the negative pressure is formed in the region of the by-pass line at the upper part of the piston; when the toilet is actuated, the first blow-off valve is opened, and the sewage is sucked by the negative pressure to the portion of communication between the blow-off line and the upper opening of the by-pass line; the reciprocating motion device drives the piston to move up to the top, the positive pressure is formed in the region of the by-pass line at the upper part of the piston, and the negative pressure is formed in the region of the by-pass line at the lower part of the piston; the second blow-off valve is opened, and the sewage is pushed by the positive pressure and sucked by the negative pressure to the portion of communication between the blow-off line and the lower opening of the by-pass line; the reciprocating motion device drives the piston to move down to the bottom, the positive pressure is formed in the region of the by-pass line at the lower part of the piston, the third blow-off valve is opened, and the sewage is discharged to the sewage tank under the action of the positive pressure; and the third blow-off valve is closed to complete one cyclic sewage disposal operation.

13. An operating method of the motor train unit feces collecting system according to claim 4, comprising the following steps:
in an initial state, the piston is at the bottom, and the negative pressure is formed in the region of the by-pass line at the upper part of the piston; when the toilet is actuated, the first blow-off valve is opened, and the sewage is sucked by the negative pressure to the portion of communication between the blow-off line and the upper opening of the by-pass line; the reciprocating motion device drives the piston to move up to the top, the positive pressure is formed in the region of the by-pass line at the upper part of the piston, and the negative pressure is formed in the region of the by-pass line at the lower part of the piston; the second blow-off valve is opened, and the sewage is pushed by the positive pressure and sucked by the negative pressure to the portion of communication between the blow-off line and the lower opening of the by-pass line; the reciprocating motion device drives the piston to move down to the bottom, the positive pressure is formed in the region of the by-pass line at the lower part of the piston, the third blow-off valve is opened, and the sewage is discharged to the sewage tank under the action of the positive pressure; and the third blow-off valve is closed to complete one cyclic sewage disposal operation.

14. An operating method of the motor train unit feces collecting system according to claim 5, comprising the following steps:

in an initial state, the piston is at the bottom, and the negative pressure is formed in the region of the by-pass line at the upper part of the piston; when the toilet is actuated, the first blow-off valve is opened, and the sewage is sucked by the negative pressure to the portion of communication between the blow-off line and the upper opening of the by-pass line; the reciprocating motion device drives the piston to move up to the top, the positive pressure is formed in the region of the by-pass line at the upper part of the piston, and the negative pressure is formed in the region of the by-pass line at the lower part of the piston; the second blow-off valve is opened, and the sewage is pushed by the positive pressure and sucked by the negative pressure to the portion of communication between the blow-off line and the lower opening of the by-pass line; the reciprocating motion device drives the piston to move down to the bottom, the positive pressure is formed in the region of the by-pass line at the lower part of the piston, the third blow-off valve is opened, and the sewage is discharged to the sewage tank under the action of the positive pressure; and the third blow-off valve is closed to complete one cyclic sewage disposal operation.

15. An operating method of the motor train unit feces collecting system according to claim 6, comprising the following steps:

in an initial state, the piston is at the bottom, and the negative pressure is formed in the region of the by-pass line at the upper part of the piston; when the toilet is actuated, the first blow-off valve is opened, and the sewage is sucked by the negative pressure to the portion of communication between the blow-off line and the upper opening of the by-pass line; the reciprocating motion device drives the piston to move up to the top, the positive pressure is formed in the region of the by-pass line at the upper part of the piston, and the negative pressure is formed in the region of the by-pass line at the lower part of the piston; the second blow-off valve is opened, and the sewage is pushed by the positive pressure and sucked by the negative pressure to the portion of communication between the blow-off line and the lower opening of the by-pass line; the reciprocating motion device drives the piston to move down to the bottom, the positive pressure is formed in the region of the by-pass line at the lower part of the piston, the third blow-off valve is opened, and the sewage is discharged to the sewage tank under the action of the positive pressure; and the third blow-off valve is closed to complete one cyclic sewage disposal operation.

16. An operating method of the motor train unit feces collecting system according to claim 7, comprising the following steps:

in an initial state, the piston is at the bottom, and the negative pressure is formed in the region of the by-pass line at the upper part of the piston; when the toilet is actuated, the first blow-off valve is opened, and the sewage is sucked by the negative pressure to the portion of communication between the blow-off line and the upper opening of the by-pass line; the reciprocating motion device drives the piston to move up to the top, the positive pressure is formed in the region of the by-pass line at the upper part of the piston, and the negative pressure is formed in the region of the by-pass line at the lower part of the piston; the second blow-off valve is opened, and the sewage is pushed by the positive pressure and sucked by the negative pressure to the portion of communication between the blow-off line and the lower opening of the by-pass line; the reciprocating motion device drives the piston to move down to the bottom, the positive pressure is formed in the region of the by-pass line at the lower part of the piston, the third blow-off valve is opened, and the sewage is discharged to the sewage tank under the action of the positive pressure; and the third blow-off valve is closed to complete one cyclic sewage disposal operation.

17. An operating method of the motor train unit feces collecting system according to claim 8, comprising the following steps:

in an initial state, the piston is at the bottom, and the negative pressure is formed in the region of the by-pass line at the upper part of the piston; when the toilet is actuated, the first blow-off valve is opened, and the sewage is sucked by the negative pressure to the portion of communication between the blow-off line and the upper opening of the by-pass line; the reciprocating motion device drives the piston to move up to the top, the positive pressure is formed in the region of the by-pass line at the upper part of the piston, and the negative pressure is formed in the region of the by-pass line at the lower part of the piston; the second blow-off valve is opened, and the sewage is pushed by the positive pressure and sucked by the negative pressure to the portion of communication between the blow-off line and the lower opening of the by-pass line; the reciprocating motion device drives the piston to move down to the bottom, the positive pressure is formed in the region of the by-pass line at the lower part of the piston, the third blow-off valve is opened, and the sewage is discharged to the sewage tank under the action of the positive pressure; and the third blow-off valve is closed to complete one cyclic sewage disposal operation.

18. An operating method of the motor train unit feces collecting system according to claim 9, comprising the following steps:

in an initial state, the piston is at the bottom, and the negative pressure is formed in the region of the by-pass line at the upper part of the piston; when the toilet is actuated, the first blow-off valve is opened, and the sewage is sucked by the negative pressure to the portion of communication between the blow-off line and the upper opening of the by-pass line; the reciprocating motion device drives the piston to move up to the top, the positive pressure is formed in the region of the by-pass line at the upper part of the piston, and the negative pressure is formed in the region of the by-pass line at the lower part of the piston; the second blow-off valve is opened, and the sewage is pushed by the positive pressure and sucked by the negative pressure to the portion of communication between the blow-off line and the lower opening of the by-pass line; the reciprocating motion device drives the piston to move down to the bottom, the positive pressure is formed in the region of the by-pass line at the lower part of the piston, the third blow-off valve is opened, and the sewage is discharged to the sewage tank under the action of the positive pressure; and the third blow-off valve is closed to complete one cyclic sewage disposal operation.

19. The motor train unit feces collecting system according to claim 1, wherein the reciprocating motion device comprises an eccentric link mechanism, and a link of the eccentric link mechanism is connected to the piston.

20. The motor train unit feces collecting system according to claim 1, wherein the reciprocating motion device comprises a hydraulic device, and an actuator of the hydraulic device is connected to the piston.

\* \* \* \* \*